United States Patent [19]

Terzuolo et al.

[11] E Re. 29,289

[45] Reissued July 5, 1977

[54] PRINTING PRESS WITH VARIABLE SPEED TRANSFER CYLINDER

[75] Inventors: Giancarlo Terzuolo; Federico Capetti, both of Turin, Italy

[73] Assignee: Societa Nebiolo S.p.A., Turin, Italy

[22] Filed: Feb. 18, 1976

[21] Appl. No.: 659,062

Related U.S. Patent Documents

Reissue of:

[64] Patent No.: 3,913,478
Issued: Oct. 21, 1975
Appl. No.: 401,298
Filed: Sept. 27, 1973

U.S. Applications:

[63] Continuation of Ser. No. 154,105, June 17, 1971, abandoned.

[30] Foreign Application Priority Data

June 22, 1970 Italy ..... 69147/70

[52] U.S. Cl. ..... 101/232; 271/114; 271/236; 226/178

[51] Int. Cl.[2] ..... B41F 13/24

[58] Field of Search ..... 101/232, 216, 217; 271/13, 167, 168, 94, 95, 96, 169, 114, 236; 226/48, 56, 57, 11, 13, 178

[56] References Cited

UNITED STATES PATENTS

| | | | |
|---|---|---|---|
| 1,587,501 | 6/1926 | Blaine et al. | 271/56 X |
| 1,629,118 | 5/1927 | Post | 271/56 X |
| 1,775,677 | 9/1930 | Huckins | 271/95 |
| 1,922,040 | 8/1933 | Harrold | 271/56 |
| 1,939,193 | 12/1933 | Winkler et al. | 271/95 |
| 2,245,396 | 6/1941 | Harrold et al. | 271/48 |
| 2,248,079 | 7/1941 | Harrold et al. | 271/48 |
| 2,406,205 | 8/1946 | Davidson et al. | 101/232 |
| 2,766,985 | 10/1956 | Claybourn et al. | 271/56 X |
| 2,853,296 | 9/1958 | Skow | 271/94 X |
| 2,890,884 | 6/1959 | Mestre | 271/56 |
| 3,069,025 | 12/1962 | Winkler et al. | 271/96 X |
| 3,080,163 | 3/1963 | Pasquinelli | 271/48 X |
| 3,245,683 | 4/1966 | Wordquist | 271/48 |
| 3,604,703 | 9/1971 | Nash | 271/48 |
| 3,623,720 | 11/1971 | Vite | 271/95 |
| 3,652,082 | 3/1972 | Eder | 271/114 |

*Primary Examiner*—E. H. Eickholt
*Attorney, Agent, or Firm*—Sughrue, Rothwell, Mion, Zinn & Macpeak

[57] ABSTRACT

A rotary cylinder printing press in which the disadvantages incurred by having to stop each sheet to set it in registration with the printing cylinder are overcome by carrying the longitudinal register on a transfer cylinder so that the sheets can be set in exact register with the printing cylinder without stopping. The transfer cylinder is rotated continuously in the same direction and its speed is varied cyclically as each sheet is set in register and then transferred to the printing cylinder. The transfer cylinder is also provided with a safety system which detects misalignment of sheets or damaged sheets to prevent the transfer cylinder from conveying such sheets to the printing cylinder.

9 Claims, 14 Drawing Figures

INVENTORS
GIANCARLO TERZUOLO
FEDERICO CAPETTI
BY Sughrue, Rothwell, Mion, Zinn & Macpeak
ATTORNEYS

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

INVENTOR

BY

ATTORNEY

PRINTING PRESS WITH VARIABLE SPEED TRANSFER CYLINDER

Matter enclosed in heavy brackets [ ] appears in the original patent but forms no part of this reissue specification; matter printed in italics indicates the additions made by reissue.

This is a continuation, of application Ser. No. 154,105, filed June 17, 1971 and now abandoned.

The present invention relates to printing presses, and in particular to a printing press for printing on sheets of material rather than on a web of material, and of the type having a printing cylinder which, in use, is rotated so as to have a constant peripheral velocity.

As is known, before being printed the sheets of material to be printed have to be set in register with the cylinder in order that the impression is always printed in the same position on each sheet in relation to the edges of the sheet. In such printing presses the sheets of material to be printed, normally paper, are arranged in register with the printing cylinder on a setting table. The sheets are fed one at a time onto the setting table across which they are moved at a determined speed. On the setting table the sheets are moved to a predetermined lateral position by side thrust setting means which are carried upon the setting table and which can move transversely upon it in order to set the transverse position of the sheets. The sheets are also set by longitudinal setting means operating on the front edge of each sheet before it is transferred to the printing cylinder. However, all previously known devices for this purpose operate on the sheet after having stopped it. Thus, the sheet having been placed on to a setting table by suitable feeding members and caused to move across it by a conveyor system, is then stopped by longitudinal registers, situated at the end of the setting table, and which act upon the front edge of the sheet. A lateral setting device then conveys the sheet sideways either by drawing the sheet or by thrust from the far edge, until it stops against a setter placed at the side of the setting table in the desired lateral registration position. When this operation is completed the sheet is in the desired registration position in relation to the printing cylinder with respect to both longitudinal and lateral directions, and it can be lifted by a conveyor member and conveyed to the printing cylinder with which it is now in register.

Stopping of the sheets by abutment against the front edge, however, involves numerous disadvantages most of which arise from the speed of impact of the sheets against the front edge abutments or registers. In modern presses, in which the speed of the sheet is fairly high, this impact may cause denting of the front edge of a sheet of thin paper, or may cause thick paper to bounce back from the abutment; both cases will result in "off-register" printing.

The disadvantages arising from the impact of the front edge of the sheets against the front setting abutments are greater or less depending on the speed of the printing cylinder and on the method used for lifting the sheets from the pile at the end of the setting table for feeding them onto the setting table.

There are two methods commonly in use for transferring the sheets onto the setting table; the sheets may be gripped at the front edge, that is at the edge facing the setting table, and drawn onto the table, or alternatively they may be gripped at their rear edge, that is the edge opposite to the one facing the setting table, and thrust onto the setting table. In the first case there is no overlapping of successive sheets on the setting table so that during the time in which the printing cylinder completes one revolution each sheet has to travel along the whole length of the setting table, stop, be set transversely, be lifted by a conveying member and carried into engagement with the grippers of the printing cylinder. Because of this it is necessary, for the sake of high productivity from the press, for the speed of the sheet upon the setting table to be relatively high and consequently the impact of the sheets against the front edge abutments for registration is very great.

In the second case, on the other hand, after each sheet is taken from the pile it leaves free the edge of the next lower sheet against which the feeding thrust can immediately be applied. Consequently, the sheets are fed on to the setting table in a partly overlapping superimposed relationship. In this case, when the preceding sheet is taken off the table by the conveying member to be carried into engagement with the printing cylinder grippers, the next sheet has only to run along a short length of the setting table, and not the whole length of the setting table as in the first case.

Thus, in the second case the impact of the sheet against the front edge registers occurs at a lower velocity than in the first case. This is still high enough to cause "off-register" printing, however, and in order to minimize the disadvantages due to the impact of the front edge of the sheet against the front edge register an arrangement has been used whereby the sheet is first slowed down and aligned approximately while still moving by registers, and thereafter stopped and aligned precisely against a second series of fixed registers.

Even in this case, however, the speed of impact of the sheet against the registers is quite high, since these devices are employed in high productivity machines so that even if the distance the sheet has to travel in the time taken for one revolution of the printing cylinder is only a fraction of the setting table it is nevertheless necessary for it to travel at a high speed since the time available is very small; the speed of impact against the front edge register is thus still high.

It will be appreciated that the reason these very high speeds are required is that in every case the sheet is stopped on the setting table in order to be set frontally and laterally. During the time it is stopped the sheet cannot be taken up by the conveying member, such as a transfer cylinder, and consequently the time during which the sheet is being set cannot be used for printing. One consequence of this method of operating is that there is large marginal area of the printing cylinder which cannot be used for printing.

Embodiments of the present invention seek to provide a printing press in which the setting of the sheets and their transference to a printing member does not have the disadvantages mentioned above so that more rapid and more exact printing can be achieved and a reduction in the non-utilised marginal area of the printing cylinder can be obtained.

According to the present invention there is provided a rotary printing press of the type having means for transporting sheets of material to be printed across a setting table, means for setting the sheets on the setting table in lateral and longitudinal register with a constant speed rotary printing cylinder, and a movable transfer member for subsequently transferring the sheets to the printing cylinder, in which the means for setting the sheets in longitudinal register are carried by the said movable transfer member and the arrangement is such that longitudinal setting of the sheets takes place while both they and the transfer member are in motion.

In a preferred embodiment of the invention the said transfer member and the said transport means are so controlled that as each sheet approaches the longitudinal setting means the relative speed between the sheet and the setting means is small with respect to the speed of the sheet and the sheet and the setting means are both travelling in substantially the same direction.

Similarly, it is preferred that the said transfer member is so controlled that its velocity varies periodically to be at a minimum value at the position where the sheets contact the longitudinal setting means and at a maximum value at the position where the front edge of a sheet on the transfer member is adjacent the printing cylinder and in a position to be gripped thereby.

In one embodiment of the invention the said movable member bearing the means for longitudinal setting of the sheet consists of a rotatable cylinder arranged substantially tangential to the printing cylinder and also to the setting table, and in use the said cylinder is rotated substantially continuously in the same direction, in such a way that its peripheral speed varies according to the periodic rate referred to above.

Embodiments of the invention will now be more particularly described, by way of example, with reference to the accompanying drawings in which.

In all figures corresponding components are indicated with the same reference numerals.

Figure 1:
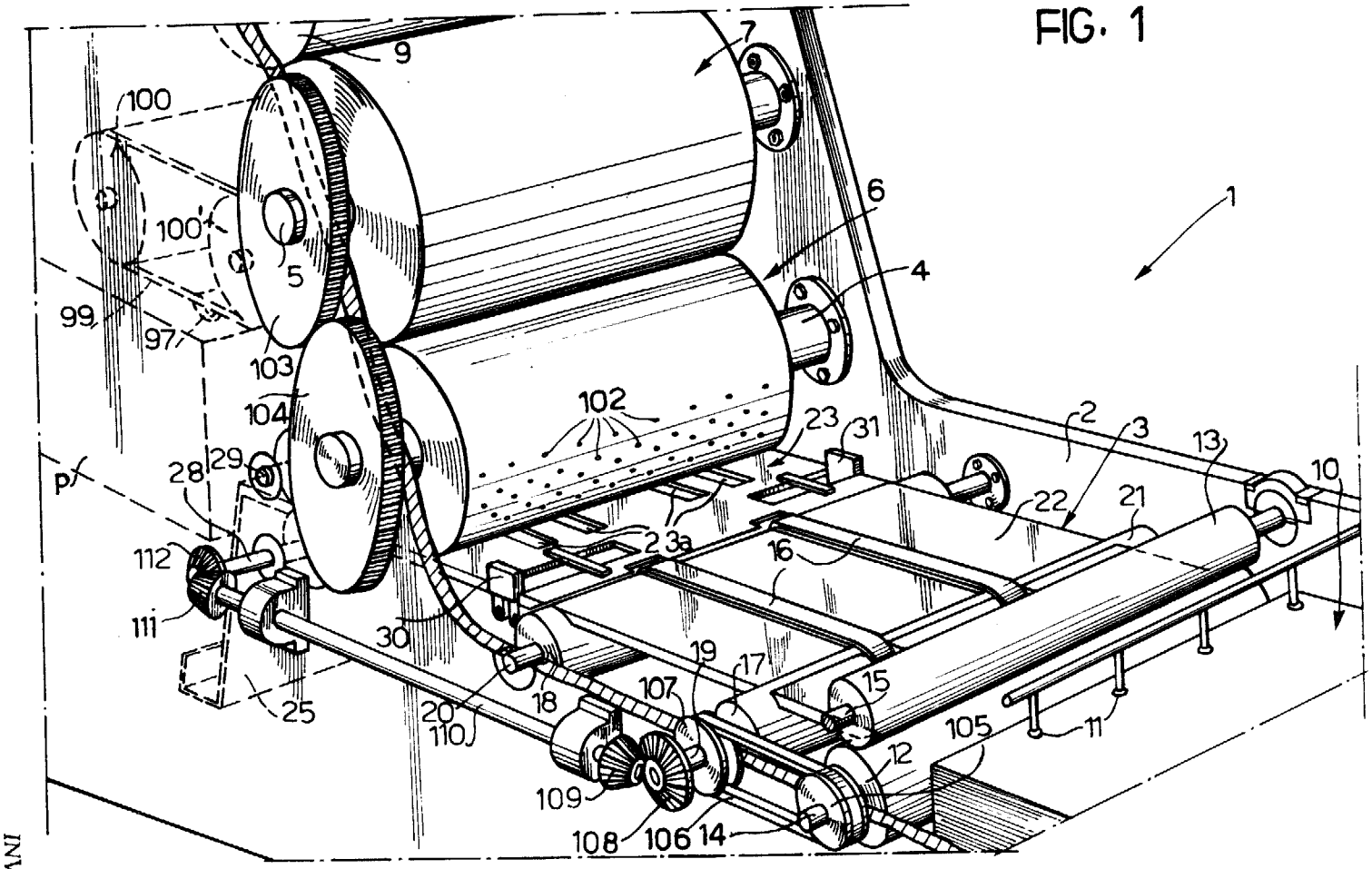
FIG. 1 is a perspective partly cut away view of part of one embodiment of a printing press constructed in accordance with invention.

Referring now to the drawings, a printing press, generally indicated 1, comprises a support frame 2, on which is mounted a setting table 3. Above one end of the setting table 3 the frame 2 carries two shafts 4 and 5 which are mounted for rotation and which themselves support a conveyor cylinder 6, and a printing cylinder 7 respectively. Above the printing cylinder 7 the frame 2 supports a shaft 8 for rotation, and the shaft 8 carries a cylinder 9 which carries the dies. The cylinder 9 is arranged to engage with the linking cylinders (not shown in the figures) and is placed in contact with the surface of the printing cylinder 7. Between the cylinders 7 and 9 a rubber cylinder (not shown in figures) could be interposed for offset printing if desired.

In front of the frame 2 there is placed a pile 10 of sheets which, by means of a pneumatic device including feeding suckers 11, are conveyed one by one towards two conveyor cylinders 12 and 13 placed one above the other with the nip between them level with the setting table 3. The cylinders 12 and 13 are supported respectively by shafts 14 and 15 which are rotatably mounted upon the frame 2, extending transversely in relation to the setting table 3 and at the end of the setting table adjacent the pile 10 of sheets to be printed. The two cylinders 12 and 13 are substantially parallel to each other with their surfaces in contact.

Over the upper surface of the setting table 3 extend two endless belts 16 which are parallel to and symmetrically located on either side of the longitudinal axis of the setting table 3. The belts 16 pass over two cylinders 17 and 18 which have their axes parallel to that of the cylinders 12 and 13. The cylinders 17 and 18 are mounted, respectively, on two shafts 19 and 20 which are rotatably mounted on the frame 2, one (the shaft 19) adjacent the conveyor cylinder 12 and the other (the shaft 20) adjacent the transport cylinder 6.

In use of the press 1 the sheets to be printed are transferred from the pile 10 between the cylinders 12, 13 across the table 3 by means of the belts 16 and under the cylinder 6 where they are gripped and carried round on the surface of the cylinder 6 to pass between this cylinder and the printing cylinder 7. At this point they are gripped by the cylinder 7 and passed round between the cylinder 7 and the cylinder 8.

Figure 2:
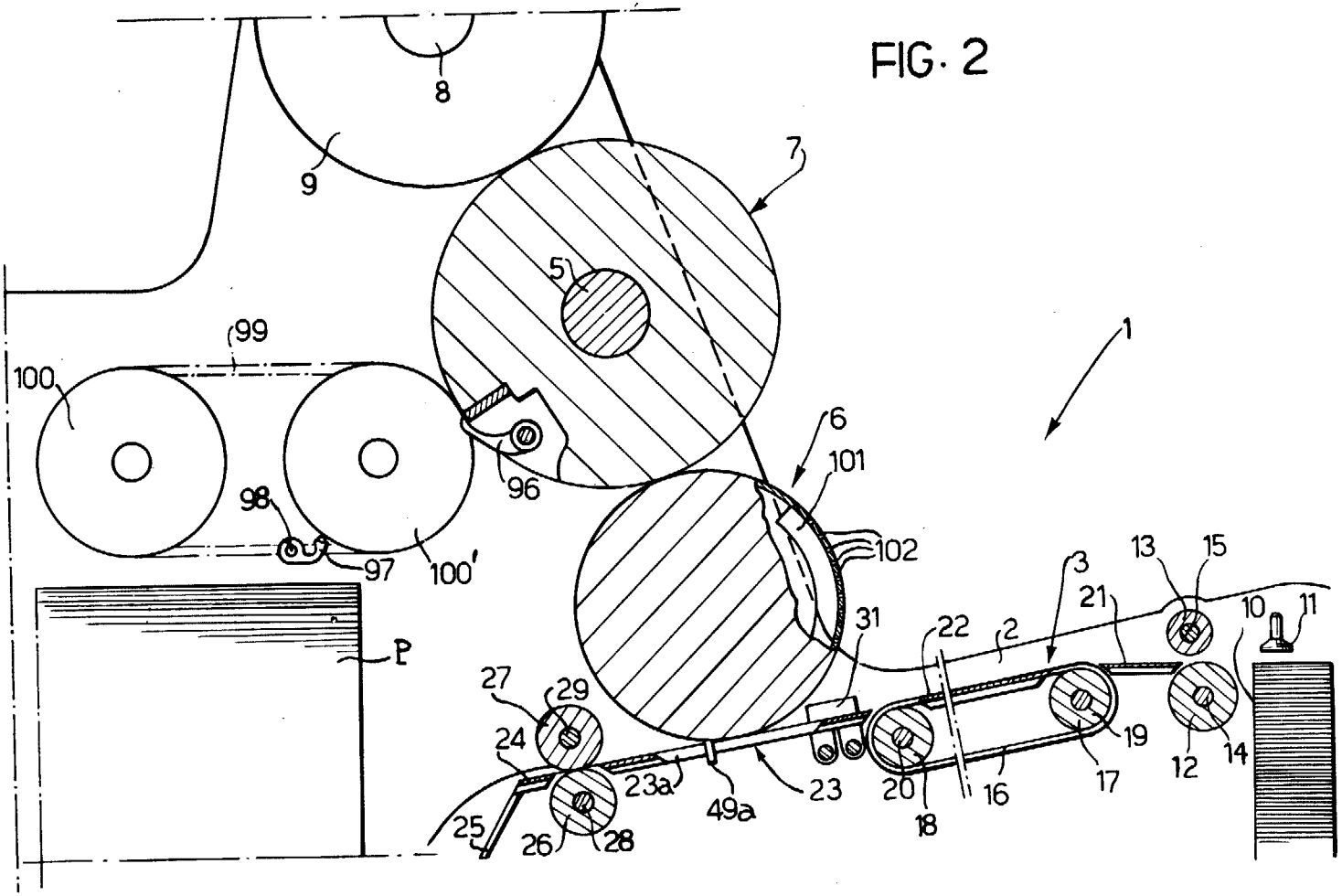
FIG. 2 is a schematic longitudinal section of the embodiment of FIG. 1.
Figure 3:
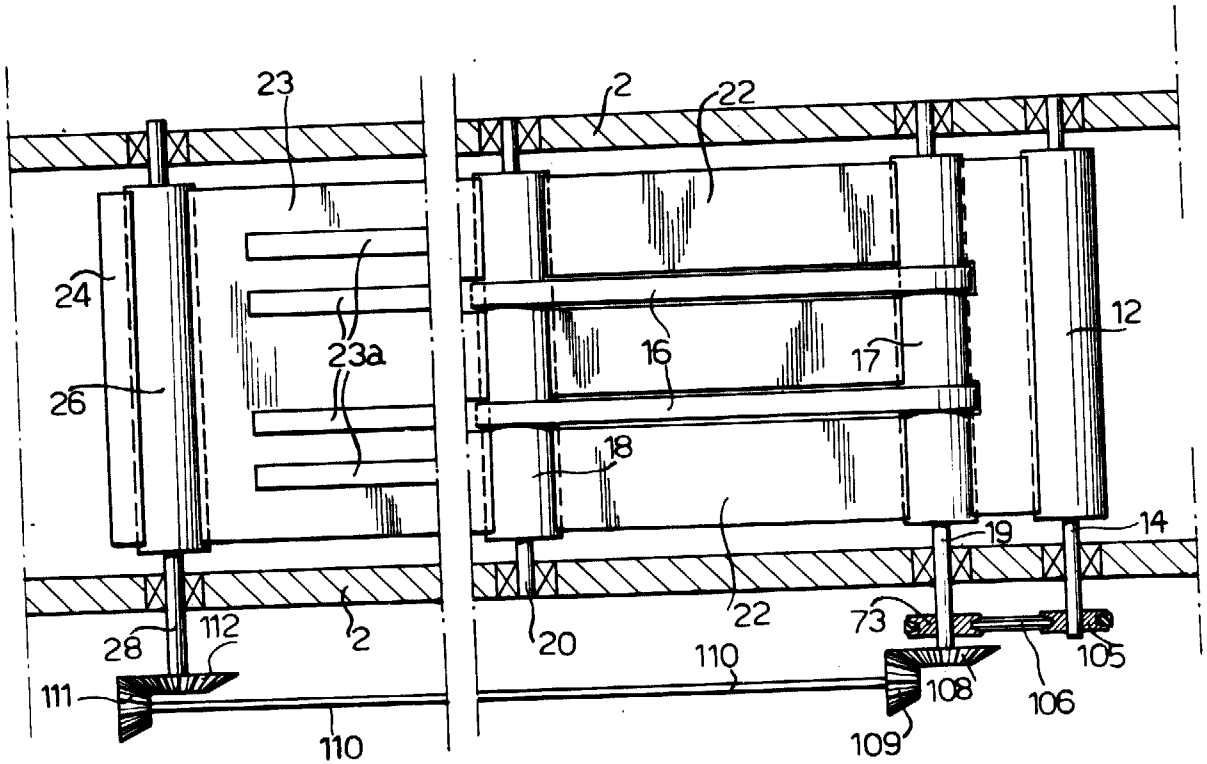
FIG. 3 is a plan view of the setting table of the embodiment of FIG. 1.
Figure 4:
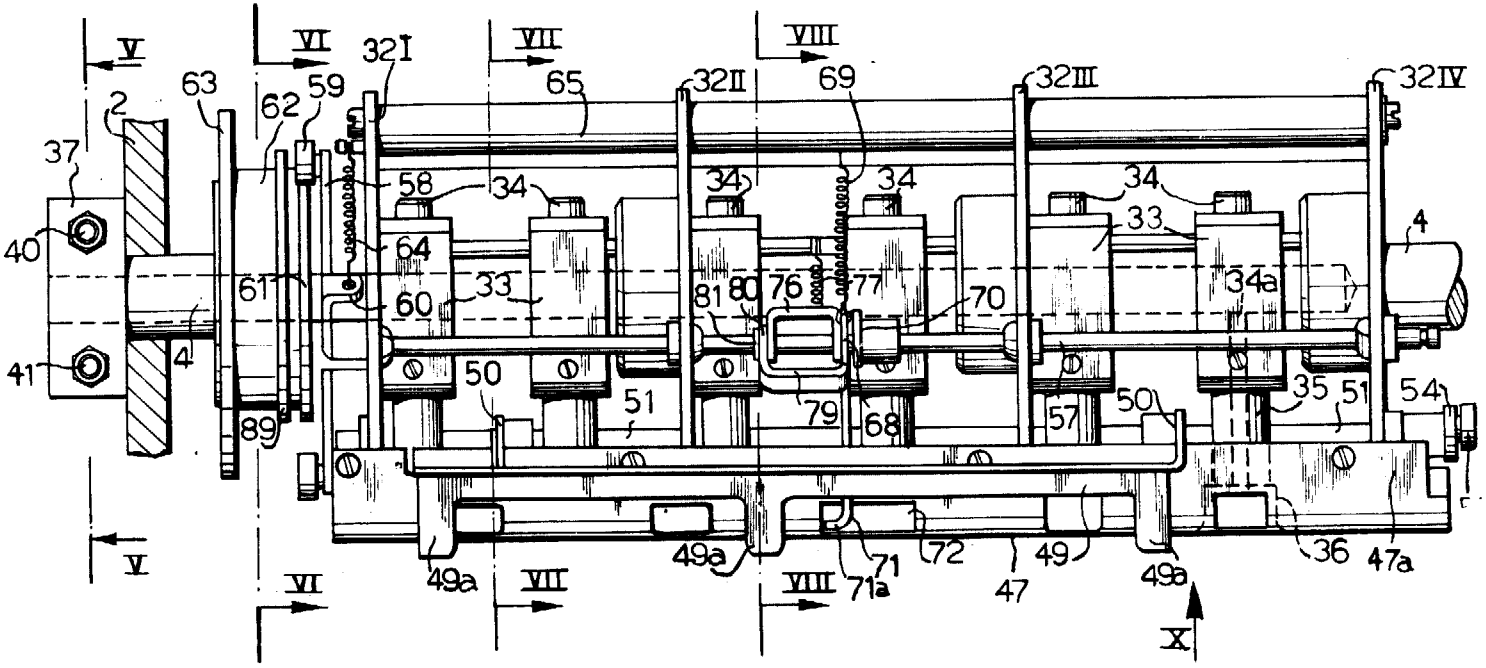
FIG. 4 is a partly cut away side view of a conveyor cylinder suitable for use in the embodiment illustrated in FIG. 1.
Figure 5:
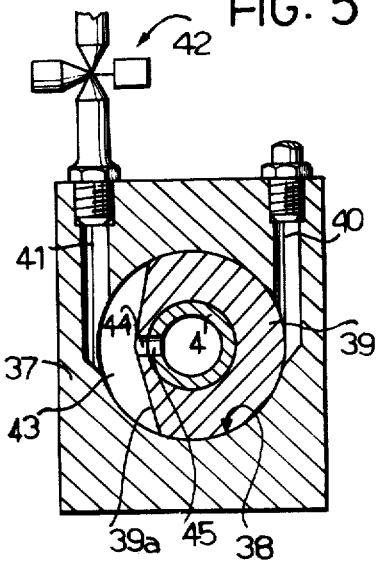
FIGS. 5 to 8 are sections taken on the lines V—V, VI—VI, VII—VII and VIII—VIII respectively of FIG. 4 illustrating the cylinder in one phase of operation.
Figure 10:
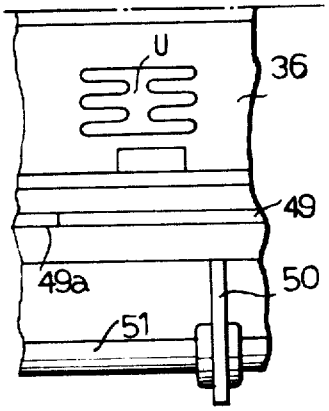
FIG. 10 is a view on an enlarged scale, of part of the surface of the cylinder shown in FIG. 4, taken in the direction of the arrow X in FIG. 4.

The setting table 3 is subdivided into four parts. The first part 21 of the setting table extends between the cylinder 12 and the cylinder 17 as will be seen particularly from FIG. 2; the second part 22 of the setting table extends between the two cylinders 17 and 18; the third part 23 of the setting table 3 is located below the cylinder 6 and the fourth part 24 constitutes the extremity of the setting table 3 and is connected at its far end to a chute 25 which leads to a compartment in which rejected sheets are collected.

Between the part 23 and the part 24 of the setting table 3 there are two cylinders 26 and 27, parallel to the cylinder 17, located one above the other with their surfaces in contact and the nip in the plane of the setting table 3. The cylinders 26 and 27 are supported respectively by coaxial shafts 28 and 29 which are rotatably mounted upon the frame 2. In the part 23 of the setting table 3 there are a number of longitudinal slots 23a.

Two side registers 30 and 31, adjustable transversely in relation to the setting table 3, and controlled by a cam (not shown) are mounted on the part 23 of the setting table 3 between the cylinder 6 and the edge of the part 23 of the setting table 3 facing the cylinder 18.

With particular reference, now to FIGS. 4 to 11, the cylinder 6 is attached rigidly to the support shaft 4 and has four transverse plates, $32_I$, $32_{II}$, $32_{III}$ and $32_{IV}$. The plates 32 are fixed to the shaft 4 at equal intervals. The plates $32_I$ and $32_{IV}$ which are located at the opposite ends of the cylinder are symmetric about the mid point of the cylinder 6. On the shaft 4 there are also fixed supports in the form of clamps 33, each being provided with a radial slot by means of which a clamping action on to the shaft 4 is effected with a screw 34.

The shaft 4 (see particularly FIGS. 4 and 6) is hollow, and adjacent each support 33, has a radial opening 34a which communicates with a rigid radial tube 35 on the support 33, the outer end of which tube 35, forms a mouth which has a mouthpiece 36 of elastic material, to form what is known as a "feeder sucker". The mouth of the tube 35 is placed close to the surface of the cylinder 6 and has an outlet U which is HH shaped (see FIG. 10).

The end of the shaft 4 projects beyond the plate $32_I$, and through the wall of the support frame 2. Over the end of the shaft 4 is fitted a casing 37 of a distributor which is arranged to connect the hollow interior of the shaft 4 with a vacuum device (not illustrated) and with the atmosphere alternately.

The casing 37 of the distributor is fixed and has (see FIG. 5) a cylindrical bore 38 within which there is a plate 39 mounted for rotation with the shaft 4 which is free to rotate within the bore 38. The bore 38 communicates, on one side with a pipe 40 which is open to the atmosphere and on a diametrically opposite side, with a pipe 41 to which is fitted the end of a three-way electro-valve 42. The electro-valve 42 normally connects the pipe 41 with a vacuum device when it is not actuated, and can connect it with the atmosphere when it is activated.

Figure 8:
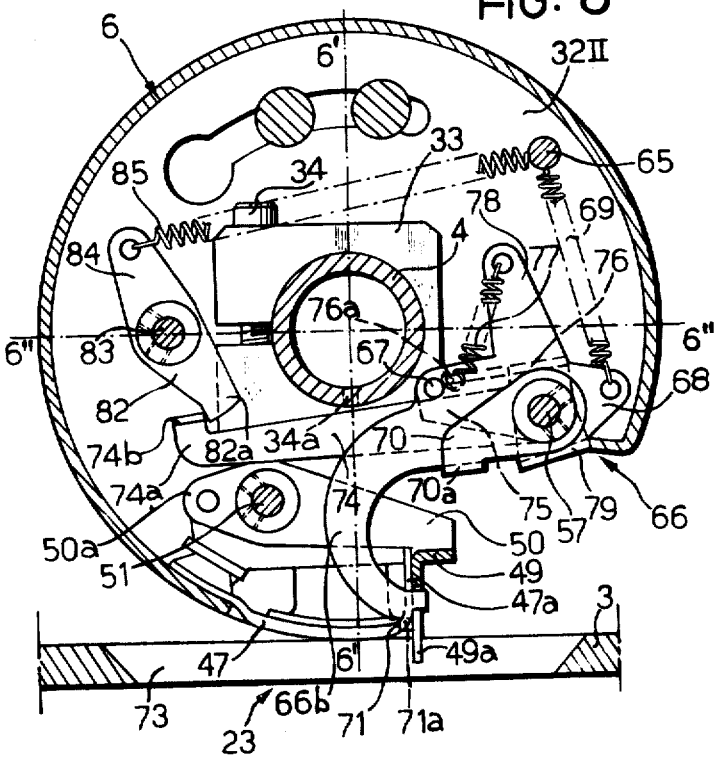

The plate 39 is cut away at 39a so that, together with the walls of the cavity 38, it defines a distribution chamber 43 which communicates alternately with one of the two pipes 40 and 41 as the shaft 4 rotates. The distribution chamber 43 is always connected to the feeder suckers 36 by means of aligned radial apertures 44 and 45 in the plate 39 and in the shaft 4 respectively, via the hollow interior of the shaft 4. Consequently the feeder suckers 36 are alternately connected with the vacuum source, and with the atmosphere as the cylinder 6 rotates. The angular position of the plate 39 in relation to the cylinder 6, and the angular extent of the cut away portion 39a are so chosen that suction through the feeder suckers starts just before a sheet has to be gripped, that is, when the cylinder 6 occupies an angular position, as shown in FIG. 8, such that the axes of the pipes 35 are substantially perpendicular to the setting table 3. The angular position of the plate 39 and the width of the cut away portion 39a are, moreover, such that suction through the feeder suckers 36 lasts only until the position where the sheet is carried between the conveyor cylinder 6 and the printing cylinder 7 whereupon it is taken by the printing cylinder 7 in a manner to be described below.

The conveyor cylinder 6 has a surface skin formed of two elements. The first element is a curved cylindrical plate 46 attached to the peripheries of the plates 32. The other element is a strip or plate 47 arranged to protect the feeder suckers 36; it is provided with apertures 48 in positions corresponding with the outlets of the feeder suckers 36, and it has a section 47a which is folded towards the inside of the cylinder 6 and which extends substantially perpendicularly to the diametrical plane 6''—6'' of the cylinder 6 (see FIG. 8).

This section 47a forms a shoulder against which reset three tongues 49a, which project out from the surface of the cylinder 6, from an axially extending fillet 49 which is supported by a pair of arms 50 keyed on to a rod 51 rotatably mounted in the plates 32. Each arm 50 has an extension 50a (see FIG. 7), on the far side of the rod 51, on to which is hooked one end of a helical spring 52, the other end of which is anchored to a rod 53, parallel to the rod 51, which is also supported by the plates 32. The tongues 49a form the longitudinal register abutments for the sheets to be printed and the tension of the springs 52 ensures that the fillet 49 and the respective tongues 49a, which form the longitudinal registers rotating with the cylinder 6, rest against the section 47a of the folded plate 47, and thus determines the normal working position of the longitudinal registers. The rod 51 extends outwardly through the plate $32_{IV}$ and carries at its end a lever 54 on to the end of which there is affixed, by means of a small lateral pin, a small roller 55 (see FIG. 7). It will thus be appreciated that as the cylinder 6 rotates the roller 55 describes a small circle centered on the center of the shaft 4.

The press 1 has a movable cam (not illustrated) carried on the fixed frame 2 near where the cylinder 6 is mounted. The cam being movable so as to overlap the circular path which the small roller 55 describes during the rotation of the cylinder 6. The cam is so shaped that, when in this position, as the roller 55 moves over the cam surface the lever 54 is rotated in the direction of the arrow 56 in FIG. 7 and the tongues 49a are retracted into the cylinder 6 so as to lie within the surface thereof. The means (not illustrated) which control the movement of the cam are such that the desired rotation of the lever 54 takes place as the tongues pass adjacent the setting table at times where, for reasons which will be explained later, a sheet has not been taken up by a feeder sucker 36.

The conveyor cylinder 6 is also supplied with a safety device which comprises a sensory lever 66 designed to check the position and/or the state of each sheet whilst it approaches the tongues 49a and as it reaches the position where it has to be gripped by the sheet lifting or gripping members which consist, in the example illustrated, of the feeder suckers 36.

The main object of the safety device is to ensure that any sheets which are so positioned, with respect to the said lifting members 36 as not to be able to be gripped firmly, shall not be taken up by the conveyor cylinder 6. This is primarily to prevent the possibility of sheets becoming detached and slipping into the moving members of the press and thereby causing damage.

Another important object which can be achieved by means of a safety device of this type is that of preventing a sheet from being printed if it has tears in its edge or, even worse, if it has wrinkles consisting of a number of pleats superimposed on one another, the presence of which can cause damage to the rubber covering of the cylinders of offset machines, which are subjected to very high printing pressures.

A further object which can be achieved with the safety device to be described is that of being able to avoid printing those sheets which for the abovementioned reasons should not be printed, in order to prevent unnecessary inking of the form and transference of the relevant imprint, on to the rubber cylinder and/or on to the printing cylinder, according to the type of printing machine on which the device is placed.

Construction of the safety device, the details of which are illustrated in FIGS. 4 to 13, is as follows:

A shaft 57, parallel to the axis of the conveyor cylinder 6, is rotatably mounted in bushes in coaxial apertures in the plates 32 located to one side of the radial pipes 35 and below the diametrical plane 6''—6'' illustated in FIG. 8.

One end of the shaft 57 projects from the plate 32, in the direction of the distributor 37 and carries (see FIGS. 4, 6 and 11) a lever which has one arm 58 extending in a direction substantially parallel to the radial pipes 35 and carrying at its end a transverse pin on which is rotatably mounted a roller 59. The lever 58 also has a second arm 60 which is shorter than the arm 58, and which extends transverse the arm 58 toward the periphery of the cylinder 6. The end of the arm 60 is folded towards the plate 32, to form an anchorage for a spring 64 which is substantially parallel to the first arm 58 and which is attached at its other end to the end of a rod 65 which extends parallel to the axis of the cylinder 7 for the whole length of the cylinder 6. The roller 59 rests against the periphery of an annular cam 61 carried on the end of a stationary bush 62 through which extends the support shaft 4 and which is mounted on the frame 2 of the press by means of a flange 63 (see FIG. 11). The face of the cam 61 has a substantially circular profile which is coaxial with the support shaft 4 with the exception of a peripheral notch 61a in the form of the arc of a circle centered on the periphery of the cam face, the radius of which is slightly greater than that of the roller 59. The tension of the spring 64 ensures contact between the roller 59 and the face of the cam 61. The shaft 57 is therefore held in a constant and well defined angular position with respect to the cylinder 6, and which will be referred to as the "normal" angular position, for most of the duration of each revolution of the cylinder 6 except when the roller 59 engages the notch 61a.

As the roller 59 engages the notch 61a of the cam 61 the shaft 57 first rotates in the same direction as the rotation of the cylinder 6, and then rotates in the opposite direction until it returns to its "normal" angular position.

Upon the shaft 57 is rotatably mounted a lever 66 forming the sensory member of the system. The lever 66 is perpendicular to the shaft 57 and thus to the axis of the cylinder 6, and is located adjacent the side of the support clamp 33 which lies at the mid-point of the cylinder 6, and on the side thereof facing the distributor 37.

Figure 9:
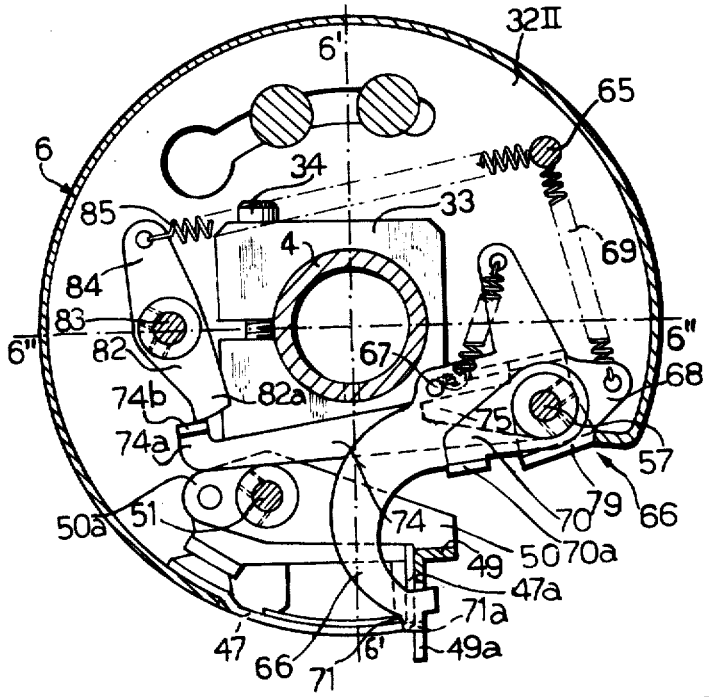
FIG. 9 is a cross section taken on the line VIII—VIII of FIG. 4 illustrating the cylinder in a second phase of operation.
Figure 11:
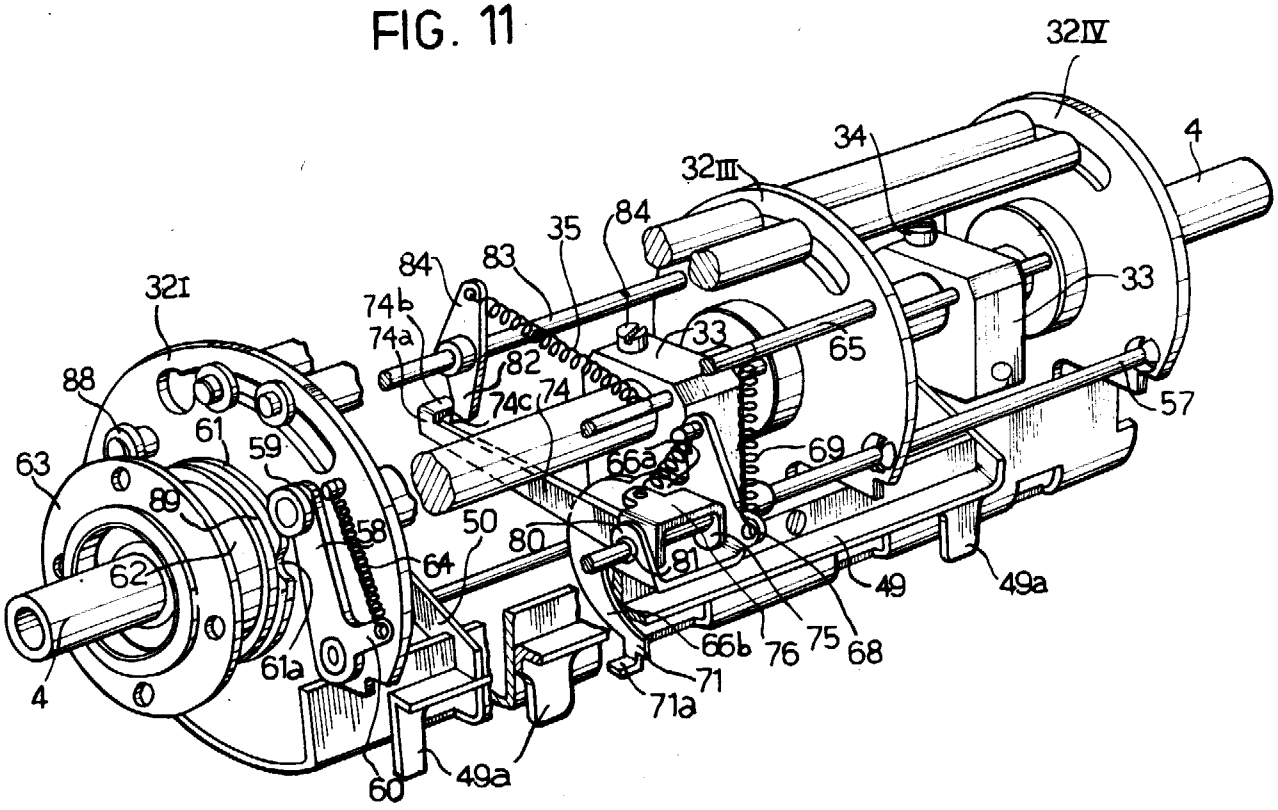
FIG. 11 is a partially cut-away perspective view of the conveyor cylinder shown in FIG. 4.

The sensory lever 66 is substantially C-shaped with an elongate upper limb 66a (see FIG. 11) which extends from the pivot of the shaft 57 towards the diametrical plane 6'—6' of the cylinder 6. The upper edge of the lever 66 (as seen in FIG. 9) has a step situated a short distance from the support shaft 4, a hole extends through the step and locates a transverse pin 67 parallel to the shaft 57 and extending from the lever 66 in the direction of the distributor 37. The lever 66 has a short extension 68 diametrically opposite the section 66a, to which is attached one end of a helical spring 69 whose other end is attached to the shaft 65. The action of this spring tends to cause the lever 66 rotate about the shaft 57 in the same direction as the rotation of the cylinder 6. This is resisted, however, by the presence of a stop comprising a small lateral tooth 70a on the end of a lever 70 keyed onto the shaft 57 (see FIG. 8). The curved limb 66b of the lever 66 carries at its free end a small tooth 71 part of the end of which is folded at a right angle so as to form a small lateral tongue 71a.

The lever 66 is so shaped that for the period during which the shaft 57 is in the "normal" angular position, the tooth 71 and the small tongue 71a rest in an aperture 72 (see FIG. 4) in the sheet 47, which forms part of the surface of the cylinder in the region of the feeder suckers 36. The profile of the tooth 71 and the tongue 71a coincides substantially with the cross section of the sheet 47, so that the end of the lever 66 on which the tooth 71 and tongue 71a are formed is flush with the surface of the cylinder 6.

Thus, when the roller 59 enters the notch 61a of the cam 61, and the shaft 57 makes a small rotation in the direction of the cylinder 4, the sensory lever 66 is urged by the spring 69 to rotate in this direction also since the pressure exerted by the stop 70a is relieved as the lever 70 rotates with the shaft 57. The rotation of the lever 66 causes the tooth 71 and the tongue 71a, to extend out through the aperture 72 in the surface of the cylinder 6. They return inside the surface of the cylinder 6 as soon as the roller 59 has passed the notch 61a of the cam 61 and returns to its "normal" angular position.

Figure 6:
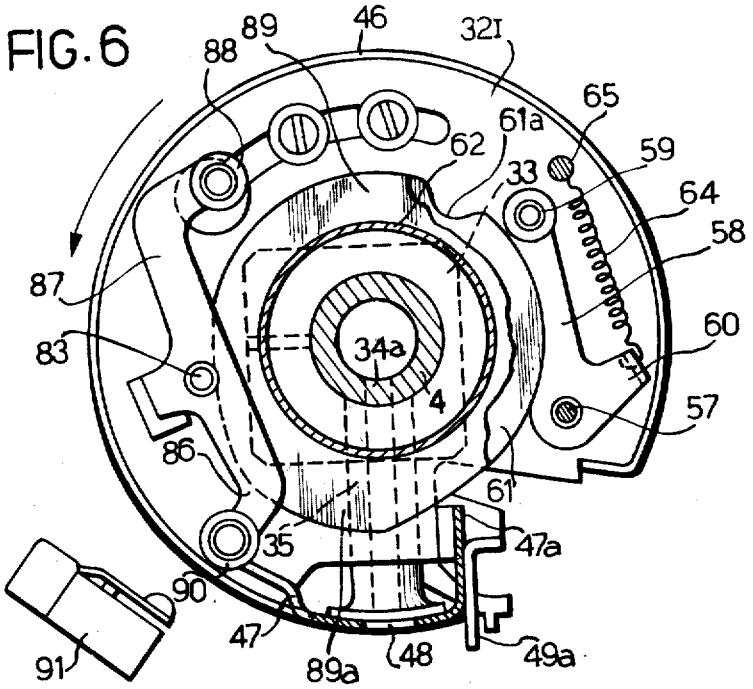
Figure 7:
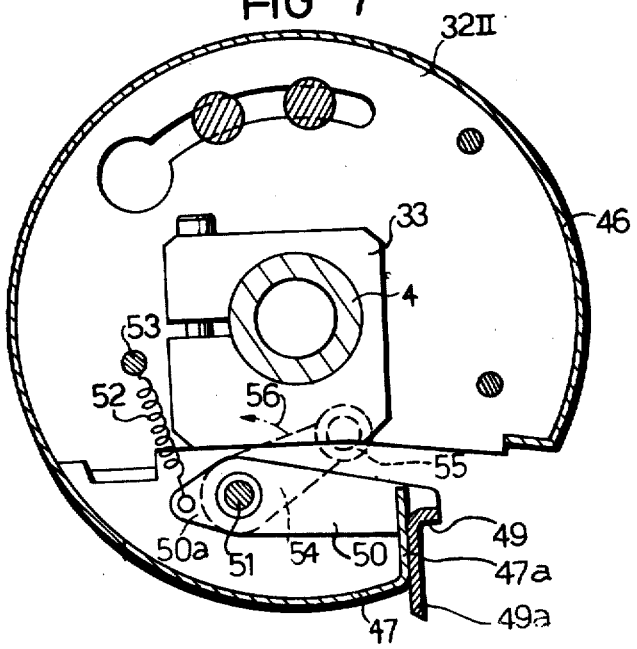

The angular position of the fixed bush 62 on which the cam 61 is mounted is so chosen that the maximum emergence of the tooth 71 from the surface of the cylinder 6 occurs when the axes of the pipes 35 are perpendicular to the setting table 3 as shown in FIG. 6. The notch 61a of the cam 61 is shaped so that, as far as posible the emergence and re-entry of the tooth 71 from and into the surface of the cylinder 6 is gradual, and the movement commences and terminates as the axes of the pipes 35 are inclined about 10° to the axial plane which is perpendicular to the setting table 3 so that the movement takes place over an angle of about 20°. The depth of the notch 61a and the dimensions of the various parts of the mechanism are sufficient to cause the tooth 71 to penetrate into a longitudinal slot 23 in the setting table 3 as it projects from the surface of the cylinder 6, so that the tooth 71 and the lateral tongue 71a extend across the space which separates the upper face of the table 3 from the surface of the cylinder 6.

The shaft 57 also carries a stop lever 74 parallel to the lever 66, but displaced along the shaft 57 toward the distributor 37, so as to be adjacent the support 33 facing the one close to which the lever 66 is situated. The lever 74 is rotatable about the shaft 57 and extends across the cylinder 6, passing close to the periphery of the support shaft 4, and terminating with a tooth 74a having a tongue 74b folded to extend transverse the lever 74.

A short lever 75 having an aperture by means of which it is freely rotatable on the shaft 57 is mounted adjacent the lever 66 on that side of the lever 66 facing the distributor 37. This lever 75 is parallel to and integral with the lever 74, to which it is connected by means of a small bridge 76 parallel to the shaft 57. The edge of the lever 75 facing the plane 6''—6'' bears against the lateral pin 67 borne by the section 66a of the sensory lever 66. Contact between this edge of the lever 75 and the stop pin 67 is maintained by a helical spring 77 which connects the end of an extension 76a (see FIG. 11) of the bridge 76 and the end of a transverse limb 78 of the sensory lever 66 which is substantially perpendicular to the limb 68 of the lever 66.

The lever 66 has a lateral extension 79 parallel to the shaft 57 on the other side of the shaft 57 from the transverse limb 78. This extension 79 forms a bridge between the sensory lever 66 and a short arm 80 (see FIG. 4) parallel to the limb 78, and rotatably mounted on the shaft 57 adjacent that face of the stop lever 74 nearest the distributor 37. A collar 81 fixed to the shaft 57 prevents movement of the arm 80 towards the distributor, and therefore holds the arms of the levers 66 and 74 and the parts connected to them in position on the shaft 57.

The tongue 74b of the tooth 74a at the end of the lever 74 has an edge 74c facing the plane 6'—6' against which bears the corner of a tooth 82a formed at one end of a rocker arm 82 of an inner rocker keyed on to a shaft 83 parallel to the axis of the cylinder 6 and extending the whole length thereof. The other arm 84 of the rocker is connected by a helical tension spring 85 to the shaft 65. The spring 85 urges the inner rocker and the small shaft 83 to rotate, in a direction opposite that in which the cylinder 6 rotates.

The shaft 83 is rotatably mounted in small bushes located in coaxial holes in the plates 32 of the cylinder 6, and extends beyond the plate $32_l$. To the projecting end of the shaft 83 is keyed an outer rocker the arms 86 and 87 of which (see FIG. 6), are aligned with each other and each is cranked at the end so that the end of the arm 86 which extends in substantially the same direction as the pipes 35 of the feeder suckers 36 is turned outwardly and the arm 87, which extends in the opposite direction, is turned inwardly at its end. The end of the arm 87 is also formed with lateral step extending towards the distributor 37, and bearing a small laterally extending pin upon which a small roller 88 is mounted. This roller 88 is arranged to co-operate with the periphery of an annular cam 89 on the bush 62 and adjacent the cam 61, between the cam 61 and the flange 63.

The annular cam 89 has a profile which is substantially circular and has a lobe 89a at an angular position spaced from the notch 61a of the arm 61. The end of the other arm 86 also carries a small lateral pin upon which is assembled a small roller 90. The length of the arm 86 and the diameter of the roller 90 are so chosen that the roller 90 is substantially flush with the outer surface of the cylinder 6 when the tooth 82a on the end of the arm 82 of the inner rocker is hooked over the lateral tongue 74b of the tooth 74a of the stop lever 74. When the lever 74 is caused to rotate by the thrust of the stop pin 67, as the roller 59 enters the notch 61a of the cam 61, the tongue 74b of the tooth 74a releases the inner rocker which rotates under the action of the tension spring 85. This rotation is transmitted to the shaft 83 and thereby to the outer rocker. This rotation continues until the roller 88 contact the circular portion of the profile of the cam 89. The radius of this portion of the cam 89 is so chosen that in this position of the rockers the corner of the tooth 82a is supported against the face of the tongue 74b, and the roller 90 projects outside the surface 46 of the cylinder 6 sufficiently for it to actuate the mobile contact of a stationary micro-switch 91. The switch 91 is connected in the electrical circuit of the electro-valve 42 (see FIG. 5), in such a way as to connect the pipe 42 with the atmosphere when actuated, and can also operate to excite a relay the activation of which eventually stops the whole machine if it is desired to do this.

The two rockers return to their initial positions when the roller 88 moves over the lobe 89a of the cam 89. This occurs after the roller 59 has left the notch 61a of the cam 61. The tooth 74a of the stop lever 74 is then biased toward the shaft 83 by the spring 77, (that is towards the initial or "normal" position), and operated to hook over the tooth 82a of the arm 82 of the inner rocker as this rotates with the shaft 83 when the roller 88 moves up onto the lobe of the cam 89. The inner rocker is then latched again and the roller 90 is within the periphery of the cylinder 6.

Figure 12:
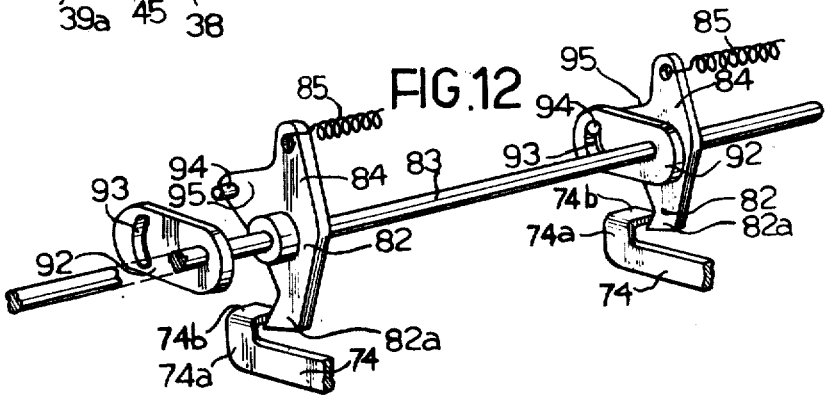
FIG. 12 is a perspective view on an enlarged scale, of some of the components of an alternative embodiment of the conveyor cylinder, shown in the positions they occupy during one phase of operation.
Figure 13:
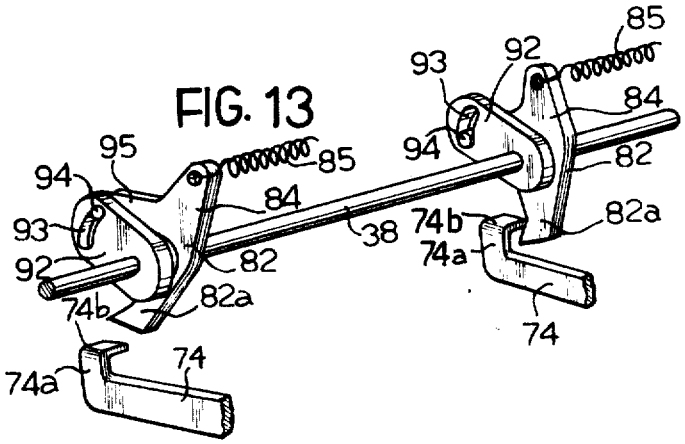
FIG. 13 is a perspective view of the members illustrated in FIG. 12, shown in the positions they occupy during another phase of operation.

In the alternative embodiment illustrated in FIGS. 12 and 13, the cylinder 6 is provided with a number of sensory levers such as 66. In this case, however there are several identical systems consisting of sensory levers and stop levers, exactly as the one just described on the shaft 57. On the shaft 83 there are a number of inner rockers, each arranged to co-operate with one of the stop levers. For example, the cylinder 6 illustrates in the drawings may be provided with three of the aforesaid systems, each placed between two adjacent plates 32 (of which there are four). In this case the construction differs from that described above by the fact that the inner rockers, instead of being keyed on to the shaft 83, are free to rotate on the shaft 83. Adjacent each of the inner rockers there is keyed on to the shaft 83 a lever 92, having an arcuate slot 93 whose center of curvature lies on the axis of the shaft 83. A small pin 94 carried on a lateral extension 95 of the inner rocker arm projects into the respective slot 93 and in the "normal" position is located at the end of the slot 93 nearest the plane 6''—6''.

The length of the slots 93 is such as to allow sufficient rotation of the shaft 83 to cause operation of the micro-switch 91 by the roller 90 without moving the rocker arms which have remained hooked on to the teeth 74a of the stop levers 74.

With this construction, the release of any one of the inner rocker arms by the tooth 74a of a co-operating stop lever 74 and the rotation of this rocker under the action of the respective spring 85, are sufficient to bring about the same rotation of the shaft 83 thereby actuating the switch 91, with consequent interruption of suction in the feeder suckers 36 and, if so arranged, eventual stopping of the whole machine.

The action of the lobe 89a of the cam 89 on the roller 88 returns the roller 90, and whichever inner rocker which has been disengaged, to their initial positions without affecting the positions of the other inner rockers which may therefore remain hooked on to the respective stop levers 74.

The inner rockers may in their turn be rendered inoperative by means of known cut-out devices whenever this should be necessary.

The printing cylinder 7 (see FIG. 2) is provided with grippers 96 along its length, and it is placed tangential to the conveyor cylinder 6 with its axis parallel to the axis of the conveyor cylinder 6.

Parallel to the axis of the printing cylinder 7 is a sheet transfer device comprising a row of grippers 97 carried by bars 98 which, in turn, are carried by chains 99 passing around pairs of toothed wheels 100 and 100'. The sheet transfer device is arranged to remove the printed sheets from the printing cylinder 7 and to place them upon a pile P of printed sheets at the end of the setting table 3 remote from the pile 10 of sheets to be printed. The conveyor cylinder 6 is provided with a pneumatic device 101 comprising a plurality of small holes 102 in the surface sheet 46 coupled to a source of air under pressure slightly greater than atmospheric pressure.

The shaft 5 supporting the printing cylinder 7 is driven at constant speed by a motor (not shown). On one end of the shaft 5 there is keyed an elliptic gear wheel 103 (see FIG. 1) which is mounted at one of the foci thereof. This gear wheel meshes with a gear wheel 104, also elliptic, which is keyed on to the end of the tubular shaft 4 of the conveyor cylinder 6. The conveyor cylinder 6 is thus driven with a peripheral speed which varies in dependence on the shape of the two gears 103 and 104.

The conveyor cylinder 12 is also driven from the shaft 5 by means of a drive train (not illustrated) which includes another pair of suitably phased elliptic gears. To the end of the support shaft 14 of the conveyor cylinder 12 there is keyed a pulley 105. The pulley 105 drives a pulley 107 by means of a toothed trapezoid belt 106. The pulley 107 is keyed to the end of the support shaft 19 of the cylinder 17 which is therefore driven at the same rate as the cylinder 12. Similarly, the support shaft 19 carries a toothed conical wheel 108 which engages a conical toothed wheel 109 which is mounted at one end of a shaft 110 which has a conical toothed wheel 111 at its other end. The wheel 111 engages a toothed conical wheel 112 keyed on to the support shaft 28 of the cylinder 26 which is therefore driven at the same rate as the cylinder 12.

Figure 14:
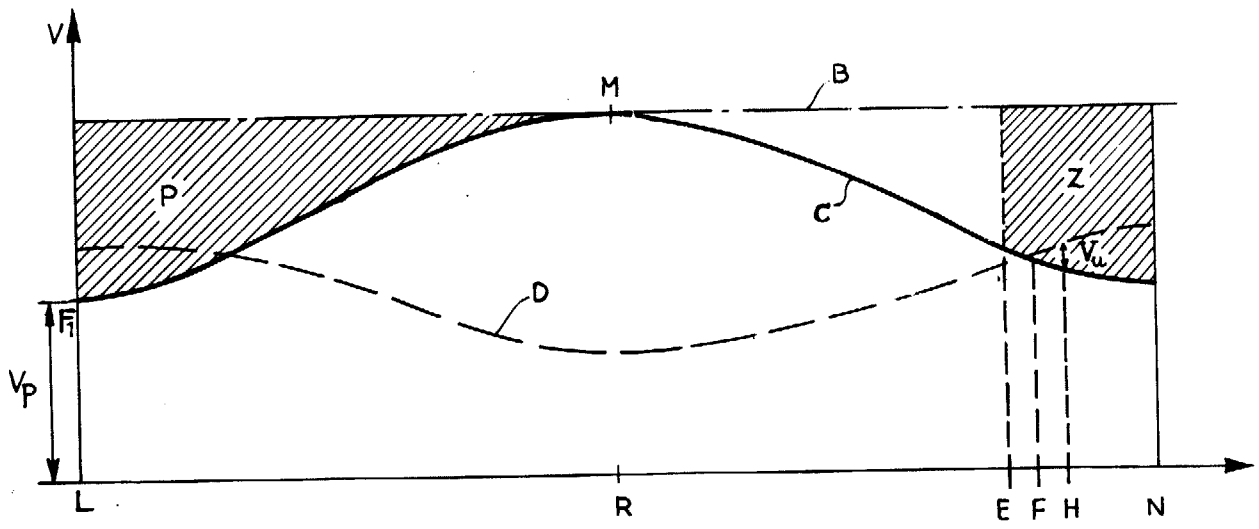
FIG. 14 is a diagram illustrating the variations of the speed of the printing press, the conveyor cylinder, and the sheets on the setting table in the printing press illustrated in FIG. 1.

In order to describe the operation of the printing press just described, it is convenient to refer to FIG. 12 which illustrates, upon a Cartesian plane, the variation of velocity with respect to time of the cylinder 6 and the sheet transport system comprising the cylinder 12 and the belts 16 driven by the cylinder 17. In FIG. 14 the peripheral constant velocity of the printing cylinder 7 is illustrated by the chain line B, the peripheral velocity of the transport cylinder 6 is illustrated by a continous line C and the velocity of a sheet upon the setting table 3 is illustrated by a dashed line D.

After a sheet has left the edge of the pile 10, the feeder suckers 11 come down upon the next sheet and place it between the conveyor cylinders 12 and 13. The cylinders 12 and 13 convey the sheet on to the setting table 3 until the sheet comes into contact with the belts 16 running on top of the said setting table 3 whereupon forward thrust by the belts 16 moves each sheet forward on the setting table 3 at a variable speed as shown by the line D of FIG. 14. As it passes the side registers 30 and 31 one of these moves transversely and sets the sheet laterally.

The transport cylinder 6, having carried the previous sheet into engagement with the grippers 96 of the printing cylinder 7 continues to rotate with a variable peripheral velocity shown by the continuous line C of FIG. 14. Since the transmission of motion from the cylinder 7 to the cylinder 6 is achieved via the two elliptical gears 103 and 104 the value of the peripheral velocity of the transport cylinder 6 carries periodically in dependence on the shape of the two gears 103 and 104. The two gears 103 and 104 have an average gear ratio equal to one so that, if the diameters of the printing cylinder 7 and the transport cylinder 6 were equal, the peripheral velocity of the transport cylinder 6 would be partly greater than and partly less than the peripheral velocity of the printing cylinder 7.

The ratio between the radii of the printing cylinder 7 and the transport cylinder 6 are, however, so chosen that the maximum peripheral velocity reached by the transport cylinder 6 is equal to the constant value of the peripheral velocity of the printing cylinder 7. Moreover the elliptic gears 103 and 104 are respectively located in such a manner that the maximim peripheral velocity of the transport cylinder 6 occurs only when the grippers 96 of the printing cylinder 7 are adjacent the transport cylinder 6. The transport cylinder 6 is assembled upon its own shaft 4 in such a position that, when the grippers 96 of the printing cylinder 7 are in the said position adjacent the transport cylinder 6, the feeder suckers 36 of the cylinder 6 are facing the grippers 96.

When a sheet on the setting table is level with the registers 30 and 31, that is at the point E of FIG. 14, for example, its velocity is slightly less than the peripheral velocity of the transport cylinder 6, as illustrated by the lines C and D. The cylinder 6 is situated, at this instant, with the longitudinal registers 49a in a position slightly above the setting table 3 and just about to penetrate into the longitudinal slots 23a in the portion 23 of the setting table 3. The peripheral velocity of the transport cylinder 6 at the point E is approaching its minimum value, and it continues to decrease slightly as the sheet begins to travel along the portion 23 of the setting table 3. As the sheet travels over the portion 23 of the setting table 3 its velocity increases until, at the position F of FIG. 14 it is equal to the peripheral velocity of the transport cylinder 6. The velocity of the sheet continues to increase from the point F onwards and the speed of the cylinder 6 continues to decrease so that the speed of the sheet is greater than that at which the longitudinal registers 49a travel along the slots 23a. The front edge of the sheet therefore catches up with the longitudinal registers 49a at the point marked H in FIG. 14 and touches them at a small relative speed shown as $V_u$.

Since the difference between the instantaneous values of the velocities of the longitudinal registers 49a and of the sheet upon the portion 23 of the setting table 3 is small, the value of $V_u$ is small and the contact of the sheet with the longitudinal register 49a occurs without the difficulties discussed above despite the fact that the transport speed of the sheet is high.

After the sheets have encountered the registers 49a and are therefore set longitudinally in register with the printing cylinder 7, the distribution chamber 43 connects the inside of the shaft 4 with the pipe 41 to create a vacuum within the pipes 35 and the feeder suckers 36 operate to clamp the sheet to the transport cylinder 6. After the sheet is clamped to the transport cylinder 6, the latter accelerates to bring its peripheral velocity to a value approaching the peripheral velocity of the printing cylinder 7, so as to be able to transfer the sheet to the grippers 61 of the printing cylinder 7.

The angle through which the transport cylinder 6 rotates in order to transport the sheet from the setting table 3 to the printing cylinder 7 is preferably about 180°. It is, in fact, necessary that, at the point of change-over of the sheet from the transport cylinder 6 to the printing cylinder 7, the peripheral velocity of the transport cylinder 6 is substantially at its maximum value.

The pneumatic device 102 then blows a small amount of air through the holes 103 in the surface 46 of the transport cylinder 6 and generates an extremely small cushion of air between the sheet held by the grippers 61 of the printing cylinder 7, and the outer surface of the transport cylinder 6 so that the sheet is not spoilt by friction against the transport cylinder 6 as the cylinder 6 slows down to accept the next sheet from the setting table 3.

As described in detail above, as the transport cylinder 6 approaches the registration position with the pipes 35 of the feeder suckers perpendicular to the setting table 3, the sensory lever 66 is released and biased to project from the surface of the cylinder by a light spring 69. If a sheet is close to the frontal registers 49a and is so positioned that it can be gripped securely by the feeder suckers 36, then it prevents the teeth 71 and 71a of the lever 66 from projecting from the surface of the cylinder and the lever 66 remains in its normal position notwithstanding the fact that the roller 59 has moved into the notch 61a of the cam 61 and the tension of the spring 64 has caused rotation of the shaft 57 and of the lever 70 carrying the stop 70a. The stop lever 74 also remains in position and locks the inner rocker 82 in position maintaining the small roller 90 in the withdrawn position. Hence action of the micro-switch 91 is prevented and the sheet becomes gripped by the feeder suckers 36 and conveyed to the printing cylinder 7 to complete the normal operation of the press.

However, if the position of a sheet moving along the setting table 3 should become shifted in relation to the frontal registers 49a so that at the moment when the sheet ought to be taken up by the feeder suckers 36 a firm hold would not be obtained, or if the sheet has a tear, or is folded over at or near its front edge, then the sensory lever 66 can rotate under the action of the spring 69. The teeth 71, 71a do not come into contact with the sheet and so their emergence from the periphery of the cylinder 6 is not prevented. This rotation of the lever 66 brings about a similar rotation of the stop lever 74 and the unlatching of the inner rocker 82, 84, with consequent emergence of the small roller 90 outside the perimeter of the plating 46 and the operation of the micro-switch 91 as described above. This causes operation of the electro-valve 42 which connects the pipe 41 with the atmosphere and prevents a vacuum from occurring inside the feeder suckers 36. The sheet is therefore not gripped, and it continues its course along the setting table 3 towards the cylinders 27 and 28 which convey it to the chute 25.

Alternatively, the whole machine can be stopped when a misaligned sheet is detected.

Naturally, the principle of the invention remaining the same, the details of construction of embodiments can be widely varied from what has been described and illustrated above by way of example, without departing from the scope of the invention.

Thus, for example, the cylinder 6 could be furnished with known mechanical grippers, in place of the pneumatic feeder suckers described above with suitable mechanical means for disabling them in response to detection of a faulty sheet by a sensory lever such as the lever 66.

What is claimed is:

1. In a rotary printing press of the type having a constant speed rotary printing cylinder, a setting table, transport means for transporting sheets of material to be printed by said printing cylinder along said setting table, lateral setting means on said setting table for setting said sheets in lateral registration with respect to said printing cylinder while said sheets are on said setting table, a continuously rotating variable speed transfer cylinder tangential to said printing cylinder and to said table, longitudinal setting means carried by said transfer cylinder for setting the front edge of said sheets in longitudinal registration with respect to said printing cylinder without stopping said sheets, and holding means carried by said transfer cylinder operable for holding the individual sheet so set in contact with said transfer cylinder, and gripping means on said printing cylinder for gripping said sheet when said holding means reaches the periphery of the printing cylinder, the improvement comprising the diameter of the transfer cylinder being smaller than the diameter of the printing cylinder.

a safety device comprised of at least one sensory lever pivotally mounted at one end on a shaft parallel to the axis of said transfer cylinder, means on said transfer cylinder urging said sensory lever to rotate so that its free end projects from the surface of said transfer cylinder, means resisting said rotation of said sensory lever to maintain it in a position such that its said free end does not project from said surface of said transfer cylinder except for a period when said holding means on said cylinder passes the position where a sheet is picked up for transfer from said setting table, a switch mounted at a relatively fixed position near said transfer cylinder, said switch, when actuated, operating to disable said holding means on said transfer cylinder, an actuating member carried by said cylinder, means on said cylinder urging said actuating member towards an actuating position.

a latching member on said cylinder, said latching member locking said actuating member away from its actuating position when said sensory lever is in such a position that its end does not project from the surface of the cylinder.

2. The printing press of claim 1 wherein said means resisting the rotation of said sensory lever comprises, a relatively fixed cam having a substantially circular cam face, a cam follower lever rigidly connected to said shaft on which said sensory lever is mounted, one end of said cam follower lever engaging the face of said cam, a stop on said shaft on which said sensory lever is mounted, said stop preventing rotation of said sensory lever when said cam follower lever is engaged on said circular part of said cam face, a notch on said cam face into which notch the end of said cam follower lever extends as said cylinder passes through the position where it lifts a sheet from said setting table to rotate said shaft and move said stop to release said sensory lever.

3. The printing press of claim 1 wherein said actuating member comprises a lever mounted for rotation with an actuator shaft parallel to said shaft which carries the sensory lever, an inner rocker on said actuator shaft, said inner rocker rigidly connected to said shaft, means biasing said shaft to rotate in a direction to move said actuator lever to said actuating position, a tooth on said inner rocker, said latching member cooperating with said tooth on said inner rocker to resist the bias of said biasing means on said inner rocker.

4. The printing press of claim 3 wherein said latching members comprises a stop lever mounted on said shaft which supports said sensory lever, a tooth on said stop lever, said tooth engaging said tooth of said inner rocker in the latched position, means coupling said sensory lever and said stop lever, said coupling means moving said stop lever to disengage it from said tooth of said inner rocker as said sensory lever rotates to project one end from the surface of said cylinder.

5. The printing press of claim 1, a further relatively fixed cam, said further cam cooperating with a further cam follower lever mounted for rotation with said shaft bearing said inner rocker, after said inner rocker has been released from its latching position with said stop lever and said transfer cylinder's holding means have been disabled, said further cam being shaped to return said inner rocker to said latching position with said stop lever, thereby returning said actuating lever to said inoperative position.

6. The printing press of claim 1, a plurality of sensory levers on said transfer cylinder, a plurality of stop levers on said transfer cylinder, means coupling each said sensory lever with a respective one of said stop levers, a plurality of inner rockers on a support shaft on said transfer cylinder, each said inner rocker engaging with one of said stop levers, said inner rockers being freely rotatably mounted upon said support shaft, an extension on each said inner rocker, a lateral pin on each said extension, a pluraity of levers keyed on to said support shaft each adjacent a respective said inner rocker, an arcuate slot in each said lever, said lateral pin engaging in respective said arcuate slots, the centre of curvature of said arcuate slots being located at the axis of said support shaft and the length of said arcuate slots being such as to allow sufficient rotation of said support shaft to actuate said stationary switch without disturbing the remaining said inner rockers, the normal position of said lateral pins in said arcuate slots being such as to ensure the immediate engagement of said lever by said corresponding rocker when the latter is disengaged from said cooperating stop lever, a biasing spring causing rotation of said support shaft.

7. The printing press of claim 1 wherein said longitudinally setting means are movably mounted on said transfer cylinder, biasing means keeping said setting means in the normal working position against a stop carried by said transfer cylinder so that said setting means extend from the surface of said transfer cylinder, and means operating said registers to withdraw within the surface of the cylinder at a predetermined angular position after a failure to grip a sheet due to the operation of the safety device.

8. In a rotary printing press of the type having a constant speed rotary printing cylinder, a planar setting table, transport means for transporting sheets of material to be printed by said printing cylinder along said setting table, lateral setting means on said setting table for setting said sheets in lateral registration with respect to said printing cylinder while said sheets are advancing on said setting table, a continuously rotating variable speed transfer cylinder tangential to said printing cylinder and to said table, longitudinal setting means carried by said transfer cylinder for setting the front edge of said sheets in longitudinal registration with respect to said transfer cylinder without stopping said sheets while they are advancing on said setting table, holding means carried by said transfer cylinder operable for holding the individual sheet so set in contact with said longitudinal setting means, and gripping means on said printing cylinder for gripping said sheet when said holding means reaches the periphery of said printing cylinder, the improvements comprising:

driving means synchronously operable upon rotation of said printing cylinder for rotating said transfer cylinder at a peripheral speed which varies periodically from a minimum value other than zero substantially at a first position where the front edge of each individual sheet contacts said longitudinal setting means and is taken by said holding means, approximately at the tangent point of said setting table with said transfer cylinder, to a maximum value, equal to the value of the constant peripheral speed of said printing cylinder, at a second position where the front edge of said sheet on said transfer cylinder is gripped by the gripping means of said printing cylinder, approximately at the tangent point of said printing cylinder with said transfer cylinder.

9. The printing press of claim 8 wherein said driving means driving said transfer cylinder includes driving and driven cooperating elliptical gears, of which the driving gear is mounted for rotation with said printing cylinder and the driven gear is mounted for rotation with said transfer cylinder, the ratio of the diameters of said printing cylinder and said transfer cylinder being such that the maximum value of the peripheral speed of said transfer cylinder is equal to the constant value of the peripheral speed of said printing cylinder.

* * * * *